(12) United States Patent
Fujita et al.

(10) Patent No.: US 8,913,842 B2
(45) Date of Patent: Dec. 16, 2014

(54) IMAGE SMOOTHING METHOD BASED ON CONTENT-DEPENDENT FILTERING

(75) Inventors: Takeo Fujita, Tokyo (JP); Narihiro Matoba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 115 days.

(21) Appl. No.: 13/696,191

(22) PCT Filed: Jul. 6, 2010

(86) PCT No.: PCT/JP2010/004411
§ 371 (c)(1),
(2), (4) Date: Nov. 5, 2012

(87) PCT Pub. No.: WO2012/004830
PCT Pub. Date: Jan. 12, 2012

(65) Prior Publication Data
US 2013/0051664 A1   Feb. 28, 2013

(51) Int. Cl.
*G06K 9/40* (2006.01)
*G06T 5/00* (2006.01)
*G06T 5/20* (2006.01)

(52) U.S. Cl.
CPC ....... *G06T 5/002* (2013.01); *G06T 2207/10004* (2013.01); *G06T 2207/20192* (2013.01); *G06T 5/20* (2013.01)
USPC ............................. 382/261; 382/262; 382/266

(58) Field of Classification Search
CPC .................. G06T 5/002; G06T 2207/20012; G06T 2207/20032; G06T 2207/20192
USPC ............................. 382/165, 261–269; 348/607
See application file for complete search history.

(56) References Cited

U.S. PATENT DOCUMENTS 5,512,956 A * 4/1996 Yan ................................. 348/606
5,812,139 A * 9/1998 Morimoto ...................... 345/428
(Continued)

FOREIGN PATENT DOCUMENTS

JP    61-195457 A    7/1994
JP    2001-157041 A    6/2001
(Continued)

OTHER PUBLICATIONS

Kang et al. ("An efficient median filter based method for removing random-valued impulse noise," Int. J. of Electronics and Communications vol. 63, 2009, 998-1004).*

(Continued)

*Primary Examiner* — Yubin Hung
(74) *Attorney, Agent, or Firm* — Birch, Stewart, Kolasch & Birch, LLP

(57) ABSTRACT

A pattern matching processing unit 10 binarizes input image data 1, compares a binarized pattern with a pattern provided for each of groups, and outputs either first information indicating a group to which a pattern that matches the binarized pattern belongs or second information indicating no match. A 0-degree direction dedicated filter 21, a 45-degree direction dedicated filter 22, a 90-degree direction dedicated filter 23, and a 135-degree direction dedicated filter 24 which are disposed correspondingly to the groups carry out smoothing processes according to the direction of an edge of the image, respectively. When the pattern matching processing unit outputs the first information, a selector 30 selects the output of either one of the filters corresponding to the group as output image data 2, whereas when the pattern matching processing unit outputs the second information, the selector outputs the input image data 1 as the output image data 2.

6 Claims, 4 Drawing Sheets

(56) References Cited

U.S. PATENT DOCUMENTS

| | | | |
|---|---|---|---|
| 6,631,210 B1* | 10/2003 | Mutoh et al. | 382/176 |
| 6,804,294 B1* | 10/2004 | Hartung et al. | 375/240 |
| 7,664,326 B2* | 2/2010 | Tamura | 382/199 |
| 2003/0156222 A1* | 8/2003 | Weston et al. | 348/606 |
| 2003/0156301 A1* | 8/2003 | Kempf et al. | 358/486 |
| 2004/0086201 A1* | 5/2004 | Muresan et al. | 382/300 |
| 2005/0157940 A1* | 7/2005 | Hosoda et al. | 382/266 |
| 2007/0025745 A1* | 2/2007 | Aoki | 399/16 |
| 2007/0076972 A1* | 4/2007 | Chiu | 382/261 |
| 2007/0189638 A1 | 8/2007 | Ohkawa et al. | |
| 2007/0195199 A1* | 8/2007 | Chen et al. | 348/607 |
| 2008/0159649 A1* | 7/2008 | Kempf et al. | 382/275 |
| 2009/0052798 A1* | 2/2009 | Kwon et al. | 382/264 |
| 2009/0080804 A1* | 3/2009 | Hamada et al. | 382/298 |
| 2009/0226085 A1* | 9/2009 | Shiraishi | 382/167 |
| 2010/0111438 A1* | 5/2010 | Chang et al. | 382/266 |
| 2010/0188582 A1* | 7/2010 | Hsu | 348/607 |
| 2011/0007973 A1* | 1/2011 | Kwon et al. | 382/199 |

FOREIGN PATENT DOCUMENTS

| | | |
|---|---|---|
| JP | 2004-282593 A | 10/2004 |
| JP | 2007-214966 A | 8/2007 |

OTHER PUBLICATIONS

Vijaykumar et al. ("Detail preserving median based filter for impulse noise removal in digital images," ICSP2008 Proceedings, Oct. 26-29, 2008, 793-796).*

Tadigotla, S.C. ("Dynamic image filter selection using partially reconfigurable FPGAs for imaging operations," 5th Int. Con. on Circuits, Systems, Electronics, Control & Signal Processing, Nov. 1-3, 2006, 60-65).*

* cited by examiner

IMAGE SMOOTHING METHOD BASED ON CONTENT-DEPENDENT FILTERING

FIELD OF THE INVENTION

The present invention relates to an image processing device which reduces jaggies on an edge which occur in image processing.

BACKGROUND OF THE INVENTION

Conventionally, as a smoothing method of smoothing an edge of a character intended for a color laser printer, for example, there has been provided a method of binarizing or ternarizing image data, determining whether the binarized or ternarized image data match a pattern in a predetermined pattern table, and, when determining that the binarized or ternarized image data match a pattern in the predetermined pattern table, replaces a notice pixel by a predetermined image signal (for example, refer to patent reference 1). Further, this patent reference 1 describes a method of carrying out edge determination on an input image, determining whether a notice pixel is placed either on a peripheral edge portion or on an image flat portion other than the peripheral edge portion, and switching whether or not to carry out a matching process according to the result of the determination, thereby providing a high-resolution output image.

RELATED ART DOCUMENT

Patent Reference

Patent reference 1: Japanese Unexamined Patent Application Publication No. 2001-157041

However, because the technique described in above-mentioned patent reference 1 is targeted only for an edge of character data which is subjected to a smoothing process, and a pixel value by which the value of a notice pixel is replaced according to the pattern that matches the image data is determined as a fixed value, the technique cannot be applied to a nature image which consists of a halftone image signal.

The present invention is made in order to solve the problem, and it is therefore an object of the present invention to provide an image processing device which can eliminate jaggies on an edge which occurs in a distortion correction process, a coordinate transformation process, and a viewpoint transformation process, and which can cope with both a reduction in the amount of computation required for the processes and an improvement in the image quality which results from the elimination of jaggies on an edge.

SUMMARY OF THE INVENTION

In accordance with the present invention, there is provide an image processing device including: a binarizing unit for binarizing luminance values of an image signal by using a luminance average value of reference pixels as a threshold; a pattern matching unit for comparing a binarized pattern outputted from the binarizing unit with a pattern for matching which is prepared in advance for each of groups, and for outputting either information indicating a group to which a pattern that matches the binarized pattern belongs or information indicating no match; a plurality of filters disposed correspondingly to the groups, respectively, each for carrying out a smoothing process according to a direction of an edge of the image; and an output data selecting unit for, when the pattern matching unit outputs the information indicating a group to which a pattern that matches the binarized pattern belongs, selecting an output of one of the filters which corresponds to the group, and for, when the pattern matching unit outputs the information indicating no match, selecting the image signal, in which the image signal has two types of signals including a luminance signal and a color difference signal, the plurality of filters include a plurality of luminance signal filters and a plurality of color difference signal filters, the plurality of luminance signal filters are disposed correspondingly to the groups, respectively, and each of the luminance signal filters carries out a smoothing process according to a direction of an edge of the luminance signal, and the plurality of color difference signal filters are disposed correspondingly to the groups, respectively, and each of the color difference signal filters carries out a smoothing process according to a direction of an edge of the color difference signal.

Advantages of the Invention

The image processing device according to the present invention can smooth jaggies on an edge of image data while maintaining the sharpness of the edge even if the image data is the one about a nature image.

EMBODIMENTS OF THE INVENTION

Hereafter, in order to explain this invention in greater detail, the preferred embodiments of the present invention will be described with reference to the accompanying drawings.

Embodiment 1

Figure 1:
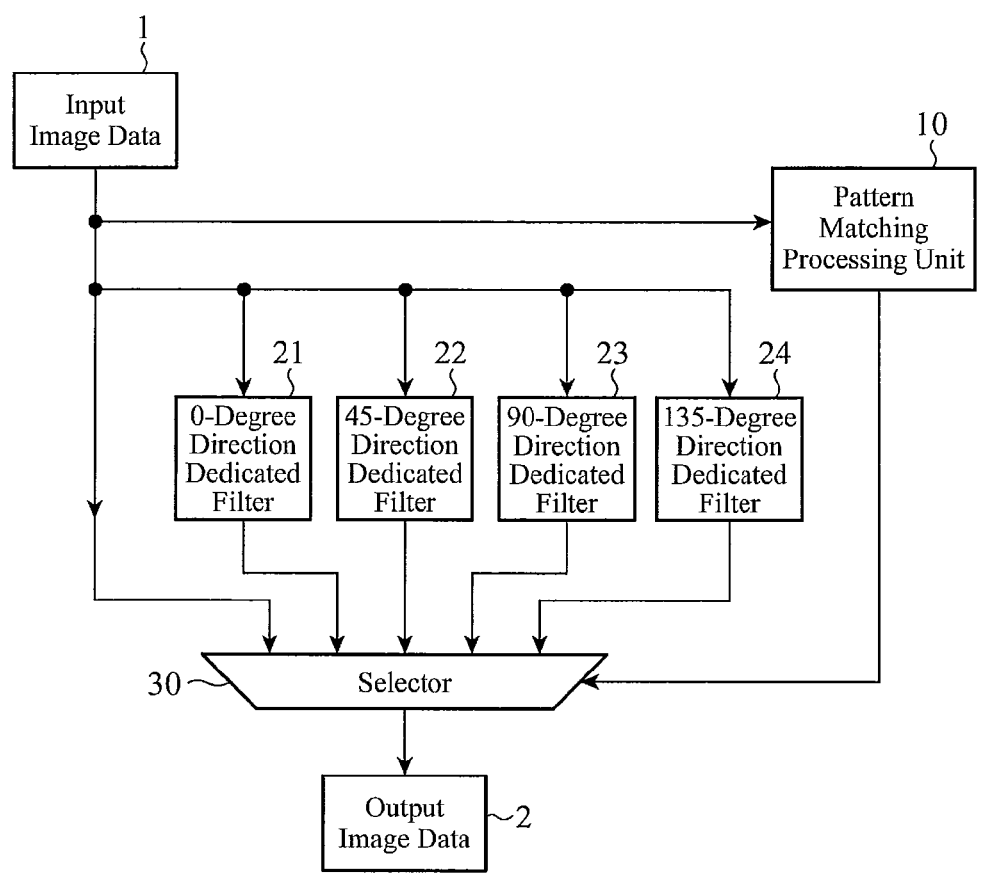
FIG. 1 is a block diagram showing an image processing device according to Embodiment 1 of the present invention.

FIG. 1 is a block diagram showing an image processing device in accordance with Embodiment 1. Referring to FIG. 1, the image processing device is provided with a pattern matching processing unit (a binarizing unit and a pattern matching unit) 10, a 0-degree direction dedicated filter 21, a 45-degree direction dedicated filter 22, a 90-degree direction dedicated filter 23, a 135-degree direction dedicated filter 24, and a selector 30. Input image data 1 is image data about an image, such as a nature image, including a halftone image signal, and output image data 2 is image data which is a result of performing a smoothing process on the input image data. The pattern matching processing unit 10 carries out a binarizing process and a pattern comparing process on the input image data 1, and outputs the result of performing these processes on the input image data. The 0-degree direction dedicated filter 21, the 45-degree direction dedicated filter 22, the 90-degree direction dedicated filter 23, and the 135-degree direction dedicated filter 24 carry out digital filtering processes corresponding an edge in a horizontal direction of a screen, an edge in a direction slanted at 45 degrees of the screen, an edge in a perpendicular direction of the screen, and an edge in a direction slanted at 135 degrees of the screen on their inputs, respectively. The selector (output data selecting unit) 30 refers to the result of the pattern matching process, and switches among output image data.

Next, the operation of the image processing device according to Embodiment 1 will be explained. Hereafter, it is assumed that the input image data 1 is data about a gray scale image in which each pixel is expressed by a value having 8 bits, 10 bits, 12 bits, or the like. First, the binarizing process and the pattern comparing process are carried out on the input image data 1 by the pattern matching processing unit 10. Hereafter, a case in which a range of pixels to be referred to as an example of a target for the processes is a block of 3 pixels×3 pixels centered at a notice pixel will be described.

Figure 2:
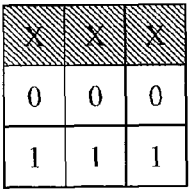
FIG. 2 is an explanatory drawing showing patterns which are used for a matching process carried out by the image processing device according to Embodiment 1 of the present invention.

In the binarizing process on the input data, the pattern matching processing unit defines each region centered at the notice pixel as a reference range, calculates the average of the pixel values in each region, and defines the calculated average as a threshold and sets each pixel having a value equal to or larger than the threshold to have a value of 1 while setting each pixel having a value smaller than the threshold to have a value of 0 to generate data which consist of nine values each of which is 0 or 1 for each region. The pattern matching processing unit then carries out the matching process of determining whether or not there is a match between the data and one of patterns which are prepared for this data in advance. FIG. 2 shows an example of the patterns for use in the matching process. "0" and "1" in the figure correspond to "0" and "1" which construct the binarized image data calculated from the image data, respectively. The binarized image data can be assumed to match a pattern only when each binarized data matches the corresponding data at the same position in the pattern. Further, "X" in the figure shows a pixel which is not subjected to the matching process, and it is assumed that each binarized data having the same position as "X" in each pattern matches the corresponding data in the pattern in either of the case of having a value "0" and the case of having a value "1".

More specifically, it is assumed that the binarized image data which are calculated from the image data match a pattern when all the pixels except the pixels each corresponding to "X" in the pattern have the same array of "0"s and "1"s as the pattern. In this case, the patterns shown in FIG. 2 are classified into the following four groups: a "0-degree direction group", a "45-degree direction group", a "90-degree direction group", and a "135-degree direction group" in advance. The pattern matching processing unit 10 then carries out the pattern matching process on the binarized image data, and, when determining that the binarized image data do not match any of the patterns, outputs a value indicating "there is no match between the binarized image data and any pattern", whereas when determining that there is a match between the binarized image data and a pattern, the pattern matching processing unit outputs a value indicating either one of "0-degree direction matching", "45-degree direction matching", "90-degree direction matching", and "135-degree direction matching" according to the group to which the pattern belongs. More specifically, the pattern matching processing unit outputs either one of five values indicating the matching state.

Figure 3:
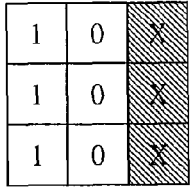
FIG. 3 is an explanatory drawing showing digital filters in the image processing device according to Embodiment 1 of the present invention.

On the other hand, the input image data 1 is simultaneously inputted to the 0-degree direction dedicated filter 21, the 45-degree direction dedicated filter 22, the 90-degree direction dedicated filter 23, and the 135-degree direction dedicated filter 24 respectively corresponding to the four types of edges in the horizontal direction, in the perpendicular direction, and in the diagonal directions. When performing a digital filtering process, in order to apply a smoothing process while suppressing a reduction in the resolution to an edge jaggy in the corresponding direction, each of the filters carries out an averaging process of averaging the pixel values along the direction of an edge. Examples of the digital filters respectively corresponding to the directions are shown in FIG. 3. In FIG. 3, each numeral shows a coefficient at the corresponding pixel position, and each "scale value" shows a number which is a divisor which is used to normalize the pixel values. By making the direction in which an edge appears in the data as shown in FIG. 2 match the direction of a pixel to be referred to in the filtering process as shown in FIG. 3, jaggies on the edge can be smoothed while the sharpness of the edge is maintained.

As mentioned above, because the image processing device according to Embodiment 1 includes: the binarizing unit for binarizing luminance values of an image signal by using a luminance average value of reference pixels as a threshold; the pattern matching unit for comparing a binarized pattern outputted from the binarizing unit with a pattern for matching which is prepared in advance for each of groups, and for outputting either information indicating a group to which a pattern that matches the binarized pattern belongs or information indicating no match; the plurality of filters disposed correspondingly to the groups, respectively, each for carrying out a smoothing process according to a direction of an edge of the image; and the output data selecting unit for, when the pattern matching unit outputs the information indicating a group to which a pattern that matches the binarized pattern belongs, selecting an output of one of the filters which corresponds to the group, and for, when the pattern matching unit outputs the information indicating no match, selecting the image signal. As a result, the image processing device can smooth jaggies on an edge of image data while maintaining the sharpness of the edge even if the image data is the one about a nature image.

Embodiment 2

Figure 4:
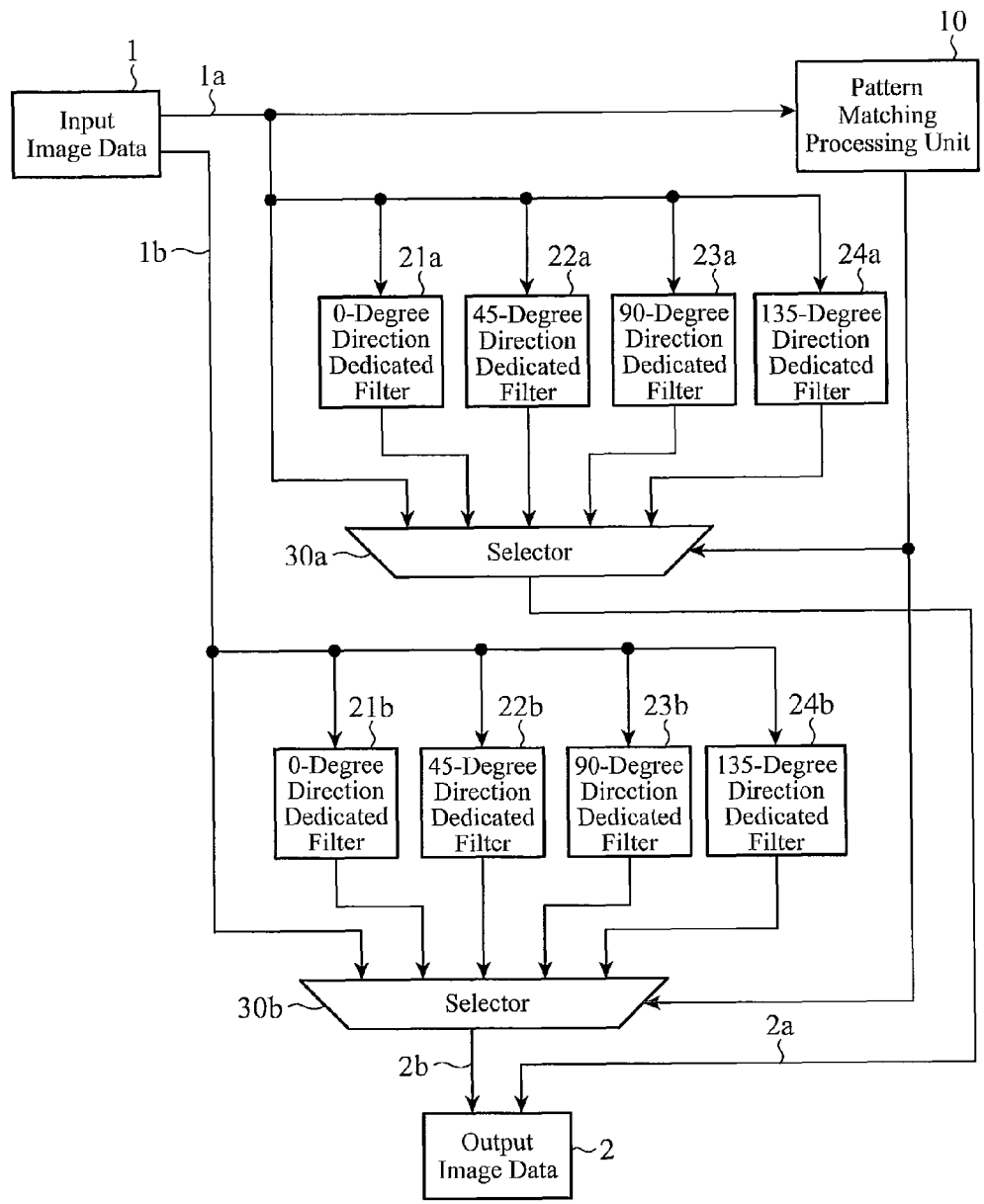
FIG. 4 is a block diagram showing an image processing device according to Embodiment 2 of the present invention.

Although the process in the case in which the input image data is the one about a gray scale image is explained in Embodiment 1, a process in a case in which the input image data is the one about a color image which consists of a luminance signal and a color difference signal will be explained in Embodiment 2. FIG. 4 is a block diagram showing an image processing device according to Embodiment 2. Referring to FIG. 4, input image data 1 consists of two types of signals including a luminance signal (Y) 1a and a color difference signal (Cb, Cr) 1b. A pattern matching processing unit 10 is constructed in such a way as to carry out a binarizing process and a pattern comparing process on the luminance signal 1a of the input image data 1 and output the result of performing these processes on the signal. Further, a 0-degree direction dedicated filter 21a, a 45-degree direction dedicated filter 22a, a 90-degree direction dedicated filter 23a, and a 135-degree direction dedicated filter 24a carry out the same digital filtering processes as those carried out by the 0-degree direction dedicated filter 21, the 45-degree direction dedicated filter 22, the 90-degree direction dedicated filter 23, and the 135-degree direction dedicated filter 24 according to Embodiment 1, respectively, and a 0-degree direction dedicated filter 21b, a 45-degree direction dedicated filter 22b, a 90-degree direction dedicated filter 23b, and a 135-degree direction dedicated filter 24b carry out the same digital filtering processes as those carried out by the 0-degree direction dedicated filter 21, the 45-degree direction dedicated filter 22, the 90-degree direction dedicated filter 23, and the 135-degree direction dedicated filter 24 according to Embodiment 1, respectively. The 0-degree direction dedicated filter 21a, the 45-degree direction dedicated filter 22a, the 90-degree direction dedicated filter 23a, and the 135-degree direction dedicated filter 24a correspond to the luminance signal 1a while the 0-degree direction dedicated filter 21b, the 45-degree direction dedicated filter 22b, the 90-degree direction dedicated filter 23b, and the 135-degree direction dedicated filter 24b correspond to the color difference signal 1b.

A selector 30a is a filter for selecting one of the outputs of the 0-degree direction dedicated filter 21a, the 45-degree direction dedicated filter 22a, the 90-degree direction dedicated filter 23a, and the 135-degree direction dedicated filter 24a on the basis of the output information from the pattern matching processing unit 10, and a selector 30b is a filter for selecting one of the outputs of the 0-degree direction dedicated filter 21b, the 45-degree direction dedicated filter 22b, the 90-degree direction dedicated filter 23b, and the 135-degree direction dedicated filter 24b on the basis of the output information from the pattern matching processing unit 10. Output image data 2 consists of a luminance signal 2a which is the result of the selection performed by the selector 30a, and a color difference signal 2b which is the result of the selection performed by the selector 30b.

Next, the operation of the image processing device according to Embodiment 2 will be explained. The pattern matching process by the pattern matching processing unit 10 is applied to the luminance signal 1a of the input image data 1. The pattern matching process is a combination of the binarizing process and the pattern comparing process which are the same as those described in Embodiment 1. As the result of the pattern matching process carried out by the pattern matching processing unit 10, a value indicating either one of the following states: "there is no match between the binarized map data and any pattern", "0-degree direction matching", "45-degree direction matching", "90-degree direction matching", and "135-degree direction matching" according to the pattern matching state is outputted through the pattern matching process. A digital filtering process is divided into processes carried out by the 0-degree direction dedicated filter 21a, the 45-degree direction dedicated filter 22a, the 90-degree direction dedicated filter 23a, and the 135-degree direction dedicated filter 24a which are applied to the luminance signal 1a, and processes carried out by the 0-degree direction dedicated filter 21b, the 45-degree direction dedicated filter 22b, the 90-degree direction dedicated filter 23b, and the 135-degree direction dedicated filter 24b which are applied to the color difference signal 1b. Individual coefficients are applied to the luminance signal and the color difference signal, respectively. Because the color difference signal 1b typically has components having lower frequencies than those of the luminance signal 1a, filtering coefficients including larger coefficients for neighboring pixels and providing higher intensity smoothing are used for the color difference signal 1b.

The pattern matching processing unit carries out the pattern matching process only on the luminance component, and the matching result is inputted to both the selector 30a corresponding to the luminance signal 1a, and the selector 30b corresponding to the color difference signal 1b, so that the image processing device carries out the digital filtering process on both the luminance component and the color difference component in such a way that the direction of an edge of the luminance component always matches that of the color difference component. As a result, the image processing device prevents a false color from occurring because of a difference between the process of handling the direction of an edge performed on the luminance signal 1a and that performed on the color difference signal 1b.

As mentioned above, the image processing device according to Embodiment 2 include: the binarizing unit for binarizing luminance values of an image signal which consists of two types of signals including a luminance signal and a color difference signal by using a luminance signal average value of reference pixels as a threshold; the pattern matching unit for comparing a binarized pattern outputted from the binarizing unit with a pattern for matching which is prepared in advance for each of groups, and for outputting either information indicating a group to which a pattern that matches the binarized pattern belongs or information indicating no match; the plurality of luminance signal filters disposed correspondingly to the groups, respectively, each for carrying out a smoothing process according to a direction of an edge of the luminance signal; a plurality of color difference signal filters disposed correspondingly to the groups, respectively, each for carrying out a smoothing process according to a direction of an edge of the color difference signal; and the output data selecting unit for, when the pattern matching unit outputs the information indicating a group to which a pattern that matches the binarized pattern belongs, selecting an output of one of the luminance signal filters which corresponds to the group and an output of one of the color difference signal filters which corresponds to the group, and for, when the pattern matching unit outputs the information indicating no match, selecting the image signal. As a result, the image processing device can suppress degradation in the image quality and a reduction in the resolution due to a false color even in a color image including a color difference component, thereby being able to smooth jaggies on an edge while maintaining the sharpness of the edge.

Embodiment 3

In Embodiment 3, a process for improving the accuracy of correction by using a combination of detection of an edge which uses pattern matching and detection of an edge which does not take the direction of an edge into consideration is shown.

Figure 5:
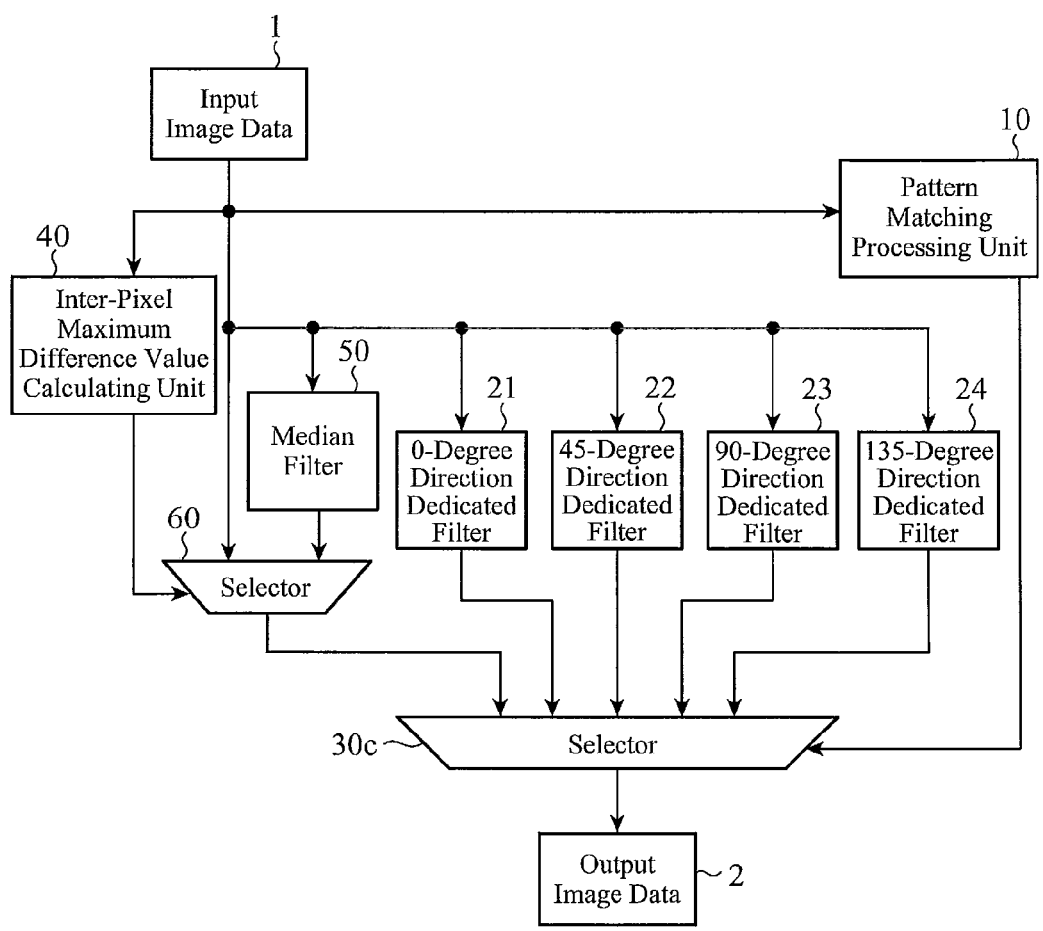
FIG. 5 is a block diagram showing an image processing device according to Embodiment 3 of the present invention.

FIG. 5 is a block diagram showing an image processing device according to Embodiment 3. The image processing device according to Embodiment 3 is provided with a pattern matching processing unit (a binarizing unit and a pattern matching unit) 10, a 0-degree direction dedicated filter 21, a 45-degree direction dedicated filter 22, a 90-degree direction dedicated filter 23, and a 135-degree direction dedicated filter 24, a selector (output data selecting unit) 30c, an inter-pixel maximum difference value calculating unit (inter-pixel maximum difference value calculating unit) 40, a median filter 50, and a selector (median output selection unit) 60. Because the pattern matching processing unit 10, and the 0-degree direction dedicated filter 21, the 45-degree direction dedicated filter 22, the 90-degree direction dedicated filter 23, and the 135-degree direction dedicated filter 24 are the same as those according to Embodiment 1, the explanation of the components will be omitted hereafter. The inter-pixel maximum difference value calculating unit 40 is a processing unit for calculating an inter-pixel maximum difference between the value of each neighboring pixel and that of a notice pixel to determine a maximum inter-pixel maximum difference. Further, the median filter 50 is a processing unit for carrying out a median process, i.e. a process of extracting a median of the values of the pixels including the neighboring pixels and the notice pixel and outputting the median. The selector 60 refers to the result of the inter-pixel maximum difference value calculating process to change output image data outputted thereby. In addition, the selector 30c is constructed in such a way as to select the output of the selector 60 when the output of the pattern matching processing unit 10 indicates "there is no match between binarized image data and any pattern."

Next, the operation of the image processing device according to Embodiment 3 will be explained. Like in the case of Embodiment 1, a pattern matching process by the pattern matching processing unit 10 is applied to input image data 1, and either one of pieces of information about the matching ("there is no match between the binarized image data and any pattern", "0-degree direction matching", "45-degree direction matching", "90-degree direction matching", and "135-degree direction matching") is sent to the selector 30c as the result of the pattern matching process. In accordance with Embodiment 1, when it is determined as the matching result that there is no match between the binarized image data and any pattern, the input signal on which no processes have been performed is selected as the output signal, just as it is. In contrast, in accordance with this embodiment, when "there is no match between the binarized image data and any pattern," the image processing device outputs the image data to which the median process has been selectively applied.

The selective application of the median process will be explained hereafter. First, the input image data 1 is inputted to the inter-pixel maximum difference value calculating unit 40. The inter-pixel maximum difference value calculating unit 40 calculates the absolute value of the difference between the pixel value of the notice pixel and that of each neighboring pixel to record the largest one of the absolute values of the differences therein. In this case, although the range of pixels to be referred to is a region of 3 pixels×3 pixels centered at the notice pixel, the range of pixels to be referred to can be changed to have another size according to the size and characteristics of the image which is the target for image processing. Information about the maximum difference value calculated by the inter-pixel maximum difference value calculating unit 40 is sent to the selector 60. The selector 60 compares the maximum difference value sent thereto with a threshold for median output selection which is determined in advance, and, when the maximum difference value is larger than this threshold, selects the output of the median process carried out by the median filter 50 as the output data, whereas when the maximum difference value is equal to or smaller than the threshold, the selector selects the unprocessed data as the output data.

A jaggy occurring on an edge includes a pixel which has a large amplitude and which is not determined as an edge through a process with matching. By not taking into consideration the direction of such a pixel, applying a combination of edge determination based on variations in local pixel values, and a smoothing process independent of the direction by using the median process, the image processing device according to Embodiment 3 can extend the range of pixels to which the image processing device applies the smoothing process, thereby being able to perform the process of smoothing jaggies which provides a larger effect.

As mentioned above, the image processing device according to Embodiment 3 includes: the binarizing unit for binarizing luminance values of an image signal by using a luminance average value of reference pixels as a threshold; the pattern matching unit for comparing a binarized pattern outputted from the binarizing unit with a pattern for matching which is prepared in advance for each of groups, and for outputting either information indicating a group to which a pattern that matches the binarized pattern belongs or information indicating no match; the plurality of filters disposed correspondingly to the groups, respectively, each for carrying out a smoothing process according to a direction of an edge of the image; the inter-pixel maximum difference value calculating unit for determining a maximum of a difference between a value of each neighboring pixel and that of a notice pixel in the image signal; a median filter for carrying out a median filtering process on the image signal; the median output selecting unit for selecting an output of the median filter when an output value of the inter-pixel maximum difference value calculating unit is larger than a predetermined threshold for median output selection, or selecting the image signal when the output value of the inter-pixel maximum difference value calculating unit is equal to or smaller than the predetermined threshold for median output selection; and the output data selecting unit for, when the pattern matching unit outputs the information indicating a group to which a pattern that matches the binarized pattern belongs, selecting an output of one of the filters which corresponds to the group, and for, when the pattern matching unit outputs the information indicating no match, selecting an output of the median output selecting unit. As a result, the image processing device can surely smooth jaggies on an edge.

In above-mentioned Embodiment 3, the structure which consists of the inter-pixel maximum difference value calculating unit 40, the median filter 50, and the selector 60 is applied to the structure according to Embodiment 1. As an alternative, the structure which consists of the inter-pixel maximum difference value calculating unit 40, the median filter 50, and the selector 60 can be applied to the structure according to Embodiment 2. In this case, the structure is disposed for both the luminance signal 1a and the color difference signal 1b of the input image data 1.

INDUSTRIAL APPLICABILITY

As mentioned above, the image processing device in accordance with the present invention is associated with a structure for reducing jaggies on an edge which occur in image processing, and is suitable for carrying out smoothing processing therein.

The invention claimed is:

1. An image processing method comprising:
    binarizing, for a notice pixel in an image signal, luminance values of a range of pixels surrounding the notice pixel to generate a binarized pattern;
    comparing the binarized pattern with each of a plurality of predetermined patterns organized into a plurality of groups each associated with a different edge-direction smoothing filter, and outputting either information indicating one of the groups to which a pattern that matches said binarized pattern belongs or information indicating that no matched patterns exist;
    determining a maximum of differences between a value of the notice pixel and respective values of each of the notice pixel's neighboring pixels in said image signal;
    applying a median filter and each of said edge-direction smoothing filters to each pixel of said image signal;
    selecting an output of said median filter for the notice pixel as an intermediate output when the determined maximum difference is larger than a predetermined threshold, and selecting the value of the notice pixel in said image signal as the intermediate output when the determined maximum difference is equal to or smaller than said predetermined threshold;

when the outputted information indicates that no matched patterns exist for the binarized pattern, selecting the intermediate output as output data for the notice pixel; and when the outputted information indicates one of the groups to which the pattern that matches the binarized pattern belongs, selecting the filtering result of the edge-direction smoothing filter associated with the group indicated by the outputted information as the output data for the notice pixel.

2. The image processing method according to claim 1, wherein the patterns in each of said plurality of groups correspond to a same edge direction.

3. The image processing method according to claim 1, wherein the binarization on the luminance values is performed by using a luminance average value of the pixels in said range as a threshold.

4. An image processing method comprising:

binarizing, for a notice pixel in an image signal, luminance values of a range of pixels surrounding the notice pixel to generate a binarized pattern;

comparing the binarized pattern with each of a plurality of predetermined patterns organized into a plurality of groups each associated with a different edge-direction smoothing filter, and outputting either information indicating one of the groups to which a pattern that matches said binarized pattern belongs or information indicating that no matched patterns exist;

determining a maximum of differences between a value of the notice pixel and each of the notice pixel's neighboring pixels in said image signal;

applying a median filter and each of said edge-direction smoothing filters to each pixel of said image signal;

selecting an output of said median filter for the notice pixel as an intermediate output when the determined maximum difference is larger than a predetermined threshold, and selecting the value of the notice pixel in said image signal as the intermediate output when the determined maximum difference is equal to or smaller than said predetermined threshold; and when the outputted information indicates that no matched patterns exist for the binarized pattern, selecting the intermediate output as output data for the notice pixel; and when the outputted information indicates one of the groups to which the pattern that matches the binarized pattern belongs, selecting the filtering result of the edge-direction smoothing filter associated with the group indicated by the outputted information as the output data for the notice pixel, wherein said image signal has two types of signals including a luminance signal and a color difference signal, said edge-direction smoothing filters include a plurality of luminance signal filters and a plurality of color difference signal filters, each of said luminance signal filters carries out a smoothing process according to a direction of an edge of said luminance signal, and each of said color difference signal filters carries out a smoothing process according to a direction of an edge of said color difference signal.

5. The image processing method according to claim 4, wherein the patterns in each of said plurality of groups correspond to a same edge direction.

6. The image processing method according to claim 4, wherein the binarization on the luminance signal is performed by using a luminance average value of the pixels in said range as a threshold.

* * * * *